(12) United States Patent
Zmierczak et al.

(10) Patent No.: US 8,299,310 B2
(45) Date of Patent: *Oct. 30, 2012

(54) PROCESSES FOR CATALYTIC CONVERSION OF LIGNIN TO LIQUID BIO-FUELS AND NOVEL BIO-FUELS

(75) Inventors: Wlodzimierz W. Zmierczak, Salt Lake City, UT (US); Jan D. Miller, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/102,799

(22) Filed: May 6, 2011

(65) Prior Publication Data

US 2011/0237838 A1    Sep. 29, 2011

Related U.S. Application Data

(63) Continuation of application No. 11/932,408, filed on Oct. 31, 2007, now Pat. No. 7,964,761, which is a continuation-in-part of application No. PCT/US2006/016969, filed on May 2, 2006.

(60) Provisional application No. 60/677,662, filed on May 2, 2005.

(51) Int. Cl.
*C12P 7/06* (2006.01)
(52) U.S. Cl. .......... 585/242; 585/14; 585/240; 585/254; 585/317; 585/319; 585/357; 585/459; 585/930; 585/934; 44/605; 44/606
(58) Field of Classification Search ............ 44/605–606; 585/14, 240, 254, 317, 319, 424, 469, 930, 585/934
See application file for complete search history.

(56) References Cited

U.S. PATENT DOCUMENTS 5,189,232 A    2/1993    Shabtai et al.
(Continued)

FOREIGN PATENT DOCUMENTS

CN    1394684    2/2003
(Continued)

OTHER PUBLICATIONS

Bhaskar, T. et al. (2008). Fuel, 87(10-11), 2236-2242.*
(Continued)

*Primary Examiner* — Walter D Griffin
*Assistant Examiner* — Brian McCaig
(74) *Attorney, Agent, or Firm* — Workman Nydegger

(57) ABSTRACT

Processes for conversion of lignin to products such as phenolic compounds and biofuels prepared from such phenolic compounds are disclosed and described. A process for conversion of a lignin material to bio-fuels can include subjecting the lignin material to a base catalyzed depolymerization reaction to produce a partially depolymerized lignin. The partially depolymerized lignin can then be subjected to a stabilization/partial hydrodeoxygenation reaction to form a partially hydrodeoxygenated product. Following partial hydrodeoxygenation, the partially hydrodeoxygenated product can be reacted in a hydroprocessing step to form a bio-fuel. Each of these reaction steps can be performed in single or multiple steps, depending on the design of the process. The production of an intermediate partially hydrodeoxygenation product and subsequent reaction thereof can significantly reduce or eliminate reactor plugging and catalyst coking. A variety of useful bio-fuels such as fuels, fuel additives, and the like, including gasoline and jet or rocket fuels are describe which can be readily produced from renewable lignin materials in an improved conversion process.

16 Claims, 10 Drawing Sheets

U.S. PATENT DOCUMENTS

| | | | |
|---|---|---|---|
| 5,266,189 | A | 11/1993 | Joseph et al. |
| 5,959,167 | A | 9/1999 | Shabtai et al. |
| 6,172,272 | B1 | 1/2001 | Shabtai et al. |
| 6,936,738 | B2 | 8/2005 | Dalloro et al. |
| 2003/0100807 | A1 | 5/2003 | Shabtai et al. |
| 2003/0115792 | A1 | 6/2003 | Shabtai et al. |
| 2004/0077906 | A1 | 4/2004 | Dalloro et al. |

FOREIGN PATENT DOCUMENTS

| | | |
|---|---|---|
| EP | 1411038 | 4/2004 |
| WO | 85/00619 | 2/1985 |
| WO | 2006/119357 | 11/2006 |

OTHER PUBLICATIONS

Elliott, D.C. (2007). Energy and Fuels, 21, 1792-1815.*

Kadangode, Subha M., Lignin Conversion into Reformulated Hydrocarbon and Partially Oxygenated Gasoline Compositions, (2001) (unpublished Ph.D. dissertation, University of Utah).

Miller, J. E., et al., "Batch Microreactor Studies of Base Catalyzed Lignin Depolymerization in Alcohol Solvents", ACS Div. Fuel Chem. Preprints of Symposia, 1999, pp. 273-275, 44(2) USA.

Shabtai, J. S. et al., "Lignin Conversion to High-Octane Fuel Additives", Biomass, Proceedings of the Fourth Biomass Conference of the Americas, Oakland, CA, (1999) pp. 811-818; vol. 1, USA.

Yurdakoc, M. et al., "Acidity of Silica-Alumina Catalysts by Amine Titration Using Hammett Indicators and FT-IR Study of Pyridine Adsorption", Turk J. Chem., (1999), pp. 319-327, 23, Diyarbakir, Turkey.

U. S. Department of Energy, Office of Energy Efficiency and Renewable Energy, "Biomass Program", U. S. DOE website, last updated Oct. 12, 2005, USA.

Ferrari, M. et al., "Influence of the active phase loading in carbon supported molybdenum-cobalt catalysts for hydrodeoxygenation reactions", Microporous and Mesoporous Materials, (2002), pp. 279-290, 56(3), Elsevier, Louvain-la-Neuve, Belgium, USA.

Laurent, E., et al., "Study of the hydrodeoxygenation of carbonyl, carboxylic and guaiacyl groups over sulfided CoMo/γ-Al2O3 and NiMo/γ-Al2O3 catalysts. I. Catalytic reaction schemes", Applied Catalysis, A: General (1994) pp. 77-96, 109(1), USA.

Centeno, A., et al., "Influce of the Support of CoMo Sulfide Catalysts and of the Addition of Potassium and Platinum on the Catalytic Performances for the Hydrodeoxygenation of Carbonyl, Carboxyl, and Guaiacol-Type Molecules", Journal of Catalysis, (1995), pp. 288-298, 154, Academic Press, Inc., USA.

Centeno, A., Use of Noble Metals in Hydrodeoxygenation Reactions, Hydrotreatment and Hydrocracking of Oil Fractions, Elsevier Science B.V., 1999, pp. 77-84, USA.

Chiranjeevi, T. et al. (2002). Journal of Molecular Catalysis A: Chemical, vol. 181, pp. 109-117.

Ratcliff, M. et al. Catalytic Hydrodeoxygenation and Dealkylation of a Lignin Model Compound, prepared paper, Am. Chem. Soc., Div. Fuel Chem.; Apr. 1, 1987; pp. 249-256 (pp. 254-255 not available); vol./Issue: 32:2; 193; national meeting of the American Chemical Society Apr. 5, 1987; Denver, CO, USA.

Train, P.M. et al. Chemical and Stochastic Modeling of Lignin Hydrodeoxygenation; prepared paper, Am. Chem. Soc., Div. Fuel Chem.; Apr. 1, 1987; pp. 240-248; vol./Issue: 32:2; 193; national meeting of the American Chemical Society Apr. 5, 1987; Denver, CO, USA.

Filley, J. et al. Vanadium Catalyzed Guaiacol Deoxygentation, Journal of Molecular Catalysis A: Chemical 139 (1999), pp. 245-252, Elsevier, USA.

Miller, J. et al., Batch Microreactor Studies of Lignin Depolymerization by Bases. 1. Alcohol Solvents, Sand Report, 2002, 19 pages, Sandia National Laboratories, Albuquerque, NM and Livermore, CA, USA.

Eager, R. L. et al. Chemical Studies on Oils Derived from Aspen Poplar Wood, Cellulose, and an Isolated Aspen Poplar Lignin, Can. J. Chem.; 1983; pp. 2010-2014; vol. 61, Canada.

Ferrari, M., et al, Upgrading of bio-fuels by catalytic hydrotreatment: Hydrodeoxygenation reaction. (The study of carbon as an alternative support to replace alumina)., Book of Abstracts, 215th ACS National Meeting, Dallas, Mar. 29-Apr. 2, 1998 American Chemical Society, Washington, D. C.

Chum, Helena L. and Overend, Ralph P., Biomass Conversion to Fuels and Chemicals, Am. Chem. Soc., Div. Fuel Chem., Prepr. Paper, 2004, 49(2), 798-799.

Czernik, S. and Bridgwater, A. V., Overview of Applications of Biomass Fast Pyrolysis Oil, Energy & Fuels, 2004, vol. 18, No. 2, 590-598.

Johnson, David K., et al., Conversion of Lignin into a Hydrocarbon Product for Blending with Gasoline, Fuel Chemistry Division Preprints 2002, 47(1), 380-381.

Meier, D. et al., Hydrocracking of Organocell Lignin for Phenol Production, Biomass and Bioenergy, 1994, vol. 7, Nos. 1-6, pp. 99-105.

Thring, R. W. et al., The production of gasoline range hydrocarbons from Alcell lignin using HZSM-5 catalyst, Fuel Processing Technology 62 (2000) 17-30, Elsevier Science B. V.

Burgess, C. E. et al., The Catalytic Effect of Carbon-Supported Ruthenium on the Depolymerization of Hydrolytic Lignin, Fuel Chemistry Division Preprints 2002, 47(1), 376-379.

Train, Peter M. and Klein, Michael T., Hydroprocessing Lignin and Lignin Model Compounds: Products, Kinetics and Catalyst Aging, Fuel Science and Technology Int'l., 1991, 9(2), 193-227.

Thring, R. W. et al., Thermolysis of Glycol Lignin in the Presence of Tetralin, The Canadian Journal of Chemical Engineering, 1993, vol. 71, February, pp. 107-115.

Miller, J. E., et al., Batch microreactor studies of lignin and lignin model compound depolymerization by bases in alcohol solvents, 1999, Fuel 78, pp. 1363-1366.

Shabtai, J. S. et al., "Conversion of Lignin. 2. Production of High-Octane Fuel Additives", ACS Div. Fuel Chem. Preprints of Symposia, 1999, pp. 267-272, 44(2), USA.

Bredenberg, J. B-son, et al., Hydrogenolysis of Differently Substituted Methoxyphenols, Journal of Catalysis, 1989, 120, 401-408, Academic Press, Inc.

Ramanathan, S. and Oyama, S. T., New Catalysts for Hydroprocessing: Transition Metal Carbides and Nitrides, J. Phys. Chem., 1995, 99, 16365-16372, American Chemical Society.

Yamitsu, U., Present status of use research of unused biomass Lignin: from petroleum substitute products to environmental-conscious materials, Kogaku-Seibutsu (Chemistry and Biology), 2003, 41(12), 784-786.

International Search Report from PCT/US2006/016969 mailed on Nov. 21, 2006, 3 Pages.

Can-Wu Lie et al., The Research and Development of Metal Nitride/Carbide-Based Catalysts and Their Capacity of Hydrogenation. Industrial Catalyst, vol. 13, No. 3, pp. 1-5. Mar. 30, 2005.

Extended European Search Report from European Patent Application No. 06 758 980.4 dated Mar. 16, 2011.

Written Opinion of the International Search Report from PCT/US2006/016969 mailed on Nov. 21, 2006, 6 Pages.

U.S. Appl. No. 11/932,408, Sep. 10, 2010, Office Action.

U.S. Appl. No. 11/932,408, Feb. 16, 2011, Notice of Allowance.

CN200680015003.6, May 27, 2010, Office Action.

CN200680015003.6, Jun. 7, 2011, Office Action.

* cited by examiner

PROCESSES FOR CATALYTIC CONVERSION OF LIGNIN TO LIQUID BIO-FUELS AND NOVEL BIO-FUELS

CROSS REFERENCE TO RELATED APPLICATIONS

This application is a continuation of and claims benefit of U.S. patent application Ser. No. 11/932,408 filed Oct. 31, 2007, issued as U.S. Pat. No. 7,964,761 on Jun. 21, 2011, which is a continuation-in-part and claims benefit of PCT Application No. PCT/US2006/016969 filed May 2, 2006, which claims the benefit of U.S. Provisional Application No. 60/677,662, filed May 2, 2005, all of which are hereby incorporated herein by reference.

BACKGROUND OF THE INVENTION

1. The Field of the Invention

The present invention relates generally to conversion of biomass to fuels, fuel additives, and other commercially useful products. More particularly, the present invention relates to a multi-step catalytic process for production of hydrocarbon products from lignin.

2. Description of the Related Art

The current market for energy carriers and fuels is largely driven by high prices of petroleum and natural gas resulting from a depletion of easily accessible deposits, a growing demand caused by the development of new emerging market economies, and mounting environmental concerns. Consequently, these increasing energy demands will require a significant restructure and/or a replacement of a major portion of fossil fuels by renewable energy technologies such as biomass-based energy technologies. Mature technologies are available for the production of a variety of bio-commodities including transportation fuels and chemical building blocks from wood, agricultural crops, municipal solid wastes, landfill gas, etc., which will enable this new energy sector to evolve. This emerging sector serves as a network of bio-refineries (petrochemical refinery analogs) and represents an integrated, environmentally sound processing group of facilities. In these facilities biomass components are separated and converted into valuable intermediates and final products, including bio-fuels, bio-power, and other bio-products.

Cellulose and lignin represent two of the most prominent renewable carbon sources. Lignin, a second to cellulose as the most plentiful renewable carbon source on, Earth, is an amorphous three-dimensional energy-rich phenolic biopolymer, which is deposited in all vascular plants and provides rigidity and strength to their cell walls. The lignin polymeric structure is composed primarily of three phenylpropanoid building units: p-hydroxyphenylpropane (Structure I), guaiacylpropane (Structure II), and syringylpropane (Structure III) interconnected by etheric and carbon-to-carbon linkages. Generally, in unprocessed lignins, two thirds or more of these linkages are ether bonds, while the remaining linkages are carbon-carbon bonds.

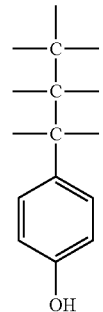

(I)

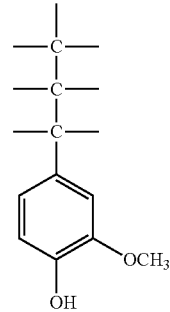

(II)

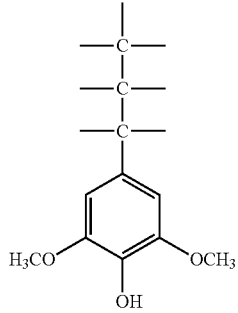

(III)

Different types of lignin differ significantly in the ratio between these monomers. Inherent in its molecular nature, the lignin bio-mass component can potentially be converted directly to liquid fuels, e.g., high-octane alkylbenzene, aromatic ether gasoline-blending components, and/or napthenic kerosenes fuels (NK).

Currently, a limited supply of lignin is available as a by-product of the pulp and paper industry. However, in the near future, large quantities of lignin residue material will be available from biomass-to-ethanol processes and other biorefineries and associated processes. So far, in typical biorefinery process designs, lignin appears as a residual material with limited opportunities for its utilization. Other sources of lignin material can include agricultural products and wastes, municipal wastes, and the like.

Upgrading of the lignin residue by a catalytic conversion process to high-value fuels and fuel additives have been sought to enhance the competitiveness of biorefinery technologies. Numerous efforts on lignin conversion have included a number of single stage processing methods including hydrocracking, cracking, hydrogenation, hydrotreating, liquefaction in hydrogen-donor solvents, and the like. However, to date, these approaches have achieved limited success for a variety of reasons.

During the past few years several studies have been initiated to develop two-stage processes for making liquid fuels and fuel additives from lignin. These studies provided significant initial groundwork in identifying commercially useful processes for the conversion of lignin to valuable high-octane bio-fuels. Two methods are of particular interest and are described in U.S. Pat. Nos. 5,959,167 and 6,172,272, each of which are incorporated herein by reference in their entireties.

One of these methods is described as a lignin-to-gasoline (LTG) two-stage process. A first step involves base-catalyst depolymerization (BCD) of lignin feed in a reaction medium such as an alcohol followed by catalytic hydroprocessing (HPR). In the BCD stage of the process, lignin is partially depolymerized, mostly by solvolysis of etheric linkages, to ether-soluble mono-, bi- and trimeric phenolic units, and some hydrocarbons. In the second stage of the procedure, hydroprocessing (HPR), the BCD product is subjected to simultaneous or sequential "exhaustive" hydrodeoxygenation (HDO) and hydrocracking (HCR) for complete removal of remaining oxygen and to break the inter-aromatic C—C linkages. The overall BCD-HPR procedure yields a low-sulfur, high-octane hydrocarbon gasoline additive consisting of a mixture of $C_7$-$C_{11}$ alkylbenzenes, and some $C_6$-$C_{11}$ mono-, di-, tri- and polyalkylated naphthenes and $C_5$-$C_{11}$ (mostly multi-branched) paraffins (the latter resulting from by-products present in the lignin).

The second two-stage method is a lignin-to-aromatic ethers (LTE) process and was designed primarily for production of partially oxygenated gasoline or for the selective production of $C_7$-$C_{11}$ methoxybenzenes as high-octane additives. This process uses a similar two-stage procedure as the first process briefly described above. In the first stage, lignin is subjected to a mild base-catalyst depolymerization (BCD) in supercritical alcohol as a reaction medium. This step is then followed by non-deoxygenation/hydrotreatment/mildhydrocracking (HT), and a subsequent etherification (ETR) of the intermediate phenolic product to yield a reformulated, partially oxygenated gasoline. The resulting gasoline is typically a mixture of (substituted) phenyl methyl ethers (blending octane number, 124-166; boiling point, 154-195° C.) and cycloalkyl methyl ethers, $C_7$-$C_{10}$ alkybenzenes, $C_5$-$C_{10}$ (mostly multi-branched) paraffins, and polyalkylated cycloalkanes. Unfortunately, these two-stage processes can suffer from excessive catalyst coking and formation of polymeric solids which tend to clog the reactors. Further, alcohol-based solvents can alkylate with the reactants and oxidize to acetic acid which reduces yields and can make disposal of by-products more difficult. Accordingly, investigations continue into developing processes for conversion of lignin to more valuable products that are economically viable, especially aromatic gasoline components and napthenic products useful as jet and rocket fuel. Many challenges still remain to provide useful product yields without sacrificing process reliability

SUMMARY OF THE INVENTION

It has been recognized that it would be advantageous to develop processes which allow for conversion of lignin to more valuable products such as bio-fuels and fuel additives with improved yields and acceptable processing conditions.

In accordance with one aspect of the present invention, a process for conversion of a lignin material to bio-fuels can include subjecting the lignin material to a base catalyzed depolymerization (BCD) reaction to produce a partially depolymerized lignin. The partially depolymerized lignin can then be subjected to a stabilization/partial hydrodeoxygenation reaction to form a partially hydrodeoxygenated product. Following hydrodeoxygenation, the partially hydrodeoxygenated product can be reacted in a hydroprocessing (refining) step to form novel biofuels bio-fuel. Each of these reaction steps can be performed in single or multiple steps, depending on the design of the process.

In one detailed aspect of the present invention, the based catalyzed depolymerization reaction can include dissolving the lignin material in an aqueous base catalyst in the presence of a polar solvent. The dissolved lignin material can then be subjected to reaction conditions sufficient to partially depolymerize the lignin material. The partially depolymerized phenolic lignin products can be recovered and optionally separated from other products as a part of the based catalyzed depolymerization reaction. The product of the partial depolymerization reaction contains components that are particularly valuable precursors which by appropriate hydroprocessing steps produce high energy content bio-fuels.

In a more detailed aspect, the base catalyst can be NaOH, KOH, $Ca(OH)_2$, $Mg(OH)_2$ and mixtures thereof, although other base catalysts could be used. The solvents are chosen to achieve solvolysis of lignin, facilitate depolymerization of lignin to phenolic substances and inhibit repolymerization of lignin. Solvents can include methanol, ethanol, water and dimethyl ether. Further, in one aspect, the base catalyzed depolymerization reaction can be carried out under conditions which are substantially free of water or alcohols such as where the phenolic compounds of the SPHDO reaction (to be described later) can be used.

In another detailed aspect, the stabilization/partial hydrodeoxygenation reaction can include exposing the partially depolymerized lignin from the BCD process to a solid catalyst at a temperature below about 300° C., e.g., from about 200° C. to about 300° C.

A variety of solid catalysts can be useful for the stabilization/partial hydrodeoxygenation reaction. Typically, the solid catalyst is a catalyst material and a support material. Preferably, the support material can be a non-acidic material such as activated carbon, silicon dioxide, aluminum oxide, titanium oxide, zirconium oxide or combinations thereof. Support materials are chosen to bring the active (metal) phase of the catalyst into contact with reactants. The choice of material for the catalyst portion of the solid catalyst can also be an important consideration. Non-limiting examples of particularly suitable catalyst material can include metals or combinations of metals from Group VI and/or Group VIII of the Periodic Table, such as Co—Mo, Rh—Mo, Ru—Mo, Pt—Mo, Pd—Mo, and alloys or composites thereof. The foregoing catalysts are preferably employed in their sulfided form.

In another detailed aspect of the present invention, the stabilization/partial hydrodeoxygenation reaction can occur at conditions sufficient to convert about 90% to about 98%, but typically 90 to 95% of methoxyphenols and benzenediols and similarly substituted polycyclic aromatic compound to phenol-based and polycyclic aromatic-based products having a single oxygen moiety.

Still another aspect of the present invention includes performing any number of hydroprocessing (refining) steps designed to achieve a particular bio-fuel product. For example, the hydroprocessing step can include a hydrodeoxygenation reaction, a mild hydrocracking reaction, a hydrogenation reaction, and/or combinations thereof.

The hydroprocessing reaction can include a hydrodeoxygenation step and a subsequent hydrocracking step. Although process conditions can vary, the hydroprocessing reaction can occur at a temperature from about 250° C. to about 400° C., and in some cases from about 320° C. to about 450° C. Hydrogen pressures vary but typically are from about 1200 to 2000 psi at the beginning of the reactions.

Alternatively, the hydroprocessing step can include a mild hydrocracking reaction followed by an etherification reaction.

In yet another alternative embodiment, the partially hydrodeoxygenated product can be fractionated into a first monomeric fraction and a second oligomeric fraction (e.g., dimers, trimers, and heavily substituted rings). The first low molecular weight fraction can be treated in an etherification reaction with methanol or ethanol to form aromatic ethers which are particularly useful as high octane fuel additives. Similarly, the second higher molecular weight alkylphenol fraction can then be treated in a hydroprocessing reaction and an optional hydrogenation reaction to form bio-fuels such as aromatic gasolines and/or naphthenic jet and rocket fuels.

Additional features and advantages of the invention will be apparent from the detailed description which illustrates, by way of example, features of the invention

BRIEF DESCRIPTION OF THE DRAWINGS

Aspects of the invention can be better understood with reference to the following drawings.

DETAILED DESCRIPTION OF THE PREFERRED EMBODIMENTS

Figure 1:
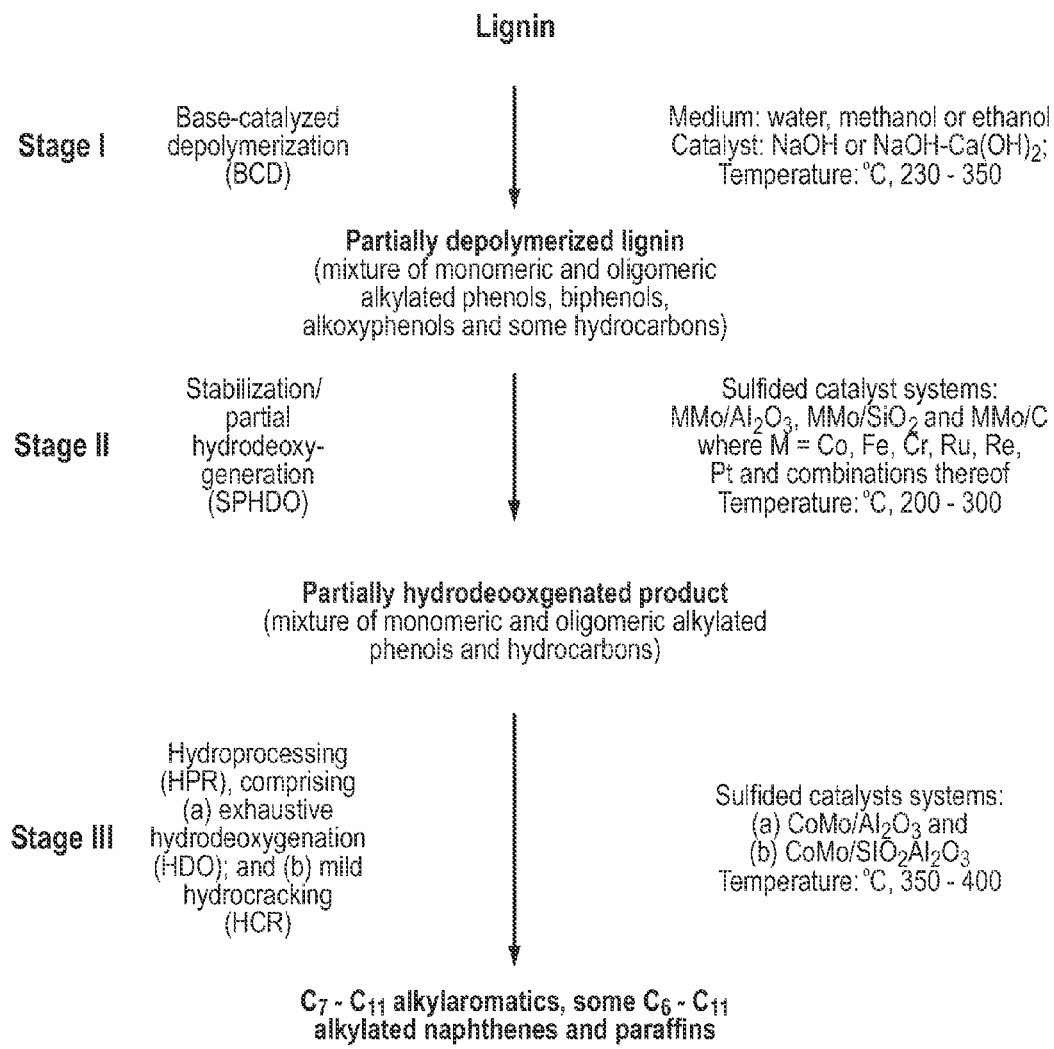
FIG. 1 is a flow diagram of a three stage process for conversion of lignin to mostly liquid alkylaromatics in accordance with an embodiment of the present invention.

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a step" includes reference to one or more of such steps.

As used herein, "reaction" is intended to cover single step and multi-step reactions which can be direct reactions of reactants to products or may include one or more intermediate species which can be stable or transient.

As used herein, "bio-fuels" refers to any fuel, fuel additive, aromatic, and/or aliphatic compound derived from a biomass starting material such as lignin.

As used herein, "lignin" and "lignin material" are used interchangeably and refer to a biomass material which is an amorphous three-dimensional energy-rich phenolic biopolymer. Lignin is typically deposited in nearly all vascular plants and provides rigidity and strength to their cell walls. As mentioned above, the lignin polymeric structure is composed primarily of three phenylpropanoid building units interconnected by etheric and carbon-to-carbon linkages. Non-limiting examples of lignin material can include agricultural lignin, wood lignin, lignin derived from municipal waste, Kraft lignin, organosolv lignin, and combinations thereof. Wood lignin is currently a widely available and renewable resource which can be particularly suitable for use in the present invention.

As used herein, "oxygen moiety" refers to any oxygen-containing substituent to an aromatic ring or other main group. Typically, oxygen moieties present on the compounds of the present invention can include hydroxyl groups; however, other groups such as methoxy, alkoxy, carboxy, and the like can also be included. Compounds containing a single oxygen moiety are stabilized, or in other words, are not polymerizable under identified process conditions, e.g. phenol or other aromatics containing a single oxygen moiety. In contrast, compounds containing two or more oxygen moieties tend to be polymerizable to form undesirable coking, e.g. methoxyphenol, benzenediol, and the like.

As used herein, "non-acidic support material" refers to a solid catalyst support which is non-acidic. In terms of a solid, the terms pH and pKa are generally unhelpful because these terms are measures of fluid conditions. As such, the acidity of a solid can be measured and expressed as a Hammett function. However, in the context of the present invention, non-acidic support materials for SPHDO (stabilization/partial hydrodeoxygenation) are those which are substantially free of acidic sites sufficient to avoid poisoning by coking. The catalysts do not possess sufficient acid strength or acid sites that catalyze repolymerization of the SPHDO product. Conventional catalyst support materials are most often provided as acidic support materials; however, non-acidic support materials can be formed or prepared by adjusting the method of preparation, subsequent treatment with bases or other available methods to remove or neutralize any acidic sites by procedures known in the art. For example, alumina support materials can be acidic or non-acidic depending on the method of preparation or subsequent treatments.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack or essential lack of an identified element or agent in a composition. Particularly, elements that are identified as being "substantially free of"

are either completely absent from the composition, or are included only in amounts which are small enough so as to have no material effect on the composition.

As used herein, the terms "partial" or "partially" when used in connection with the phrase "stabilization/partial hydrodeoxygenation" or "SPHDO" refer to the percentage of oxygen moieties eliminated from the end products of the base-catalyzed depolymerization (BCD) reaction of lignin. Substantially all of the SPHDO reaction product will have only a single oxygen moiety substituent. The percentage of the total oxygen removed from the BCD end product can range from about 20% to about 60% and preferably about 40% to about 60%. As such, more than about 85% and preferably more than about 98% of polymerizable BCD end products (i.e. products having multiple oxygen moieties) can be converted to stabilized products having single oxygen moieties. The "partial" hydrodeoxygenation occurs when the methoxy and/or hydroxyl groups are removed from methoxyphenol, or benzenediol or similar oxygenated polycyclic compounds to yield single oxygen containing phenolic or polycyclic aromatic compounds.

As used herein, "hydroprocessing" means "refining step(s)" and refers to any single reaction or combination of reactions or reaction steps which processes the partially hydrodeoxygenated products of the SPHDO reaction into a biofuel. Examples of hydroprocessing steps include but are not limited to reactions such as hydrodeoxygenation reactions, mild hydrocracking reactions, hydrogenation reactions, and combinations thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1% to about 20% should be interpreted to include not only the explicitly recited concentration limits of 1% to about 20%, but also to include individual concentrations such as 2%, 3%, 4%, and sub-ranges such as 5% to 15%, 10% to 20%, etc.

The terms "naphthene" or "napthenic" as used herein means a saturated cyclic hydrocarbon in which three or more carbon atoms are united in a ring structure which may bear one or more alkyl groups (typical compounds are cyclohexane and decalin (fully saturated naphthalene)) and alkylated derivatives thereof. Napthenes containing 5 to 11 total carbon atoms are typically useful as gasoline type fuels and higher molecular weight compounds containing 9 to 15 carbon atoms are useful as jet and rocket fuels, the latter also being referred to herein as "napthenic kerosene". Often the conversion of lignin as described herein also results in the presence of paraffins, typically containing about 14 to 24 carbon atoms, of which both branched and unbranched paraffins are examples. These paraffins usually result from the conversion of fats and/or waxes in materials commonly present with lignin starting materials and not from conversion of lignin itself. They are, however, also useful fuels.

In accordance with the present invention, bio-fuels can be produced using a three-step process including based-catalyzed depolymerization, stabilization/partial hydrodeoxygenation, and a hydroprocessing step. In previous approaches, subsequent steps of both the LTG (U.S. Pat. No. 5,959,167) as well as the LTE (U.S. Pat. No. 6,172,272) processes, the BCD product was treated in hydroprocessing (HPR) and selective hydrocracking (HC) steps with acidic catalysts at temperatures above 350° C. This approach can be useful in some circumstances; however, the high temperatures required and acidic sites can result in a reduction in reliability during scale-up and extended production runs.

Typically, lignin BCD products are primarily very reactive, thermally unstable phenolic compounds including mono-, di-, and polyalkylated phenols, methoxyphenols, benzenediols, and dimeric and trimeric phenolic compounds. Such a product, if used in the LTG or lignin to naphthenes process, as discussed hereinafter requires further upgrading, e.g., removal of oxygen via a hydrodeoxygenation process and a simultaneous (using a hybrid catalyst) or consecutive hydroprocessing, such as hydrocracking, which results in a higher chemical stability and increases hydrogen to carbon ratio ("HTC") ratio, heating value, etc. These unstable products tend to undergo rapid polymerization that results in solid plugs in the HDO and/or HPR reactions during high temperature (>300° C.) HDO process. Moreover, a relatively strong interaction of these compounds with typical HPR catalyst support acid sites (on alumina and other acidic supports), results in significant catalyst coking. Additionally, the presence of a strongly acidic hydrocracking (HCR) co-catalyst component results in fast catalyst coking and subsequent deactivation of the HCR catalyst. Similar conditions were observed in the mild hydrocracking ("MH") step of the LTE process.

In accordance with the present invention, a low temperature stabilization/partial hydrodeoxygenation (SPHDO) treatment is conducted preceding the HPR process in order to alleviate the problem of catalyst deactivation and repolymerization. Typically, SPHDO treatment can be performed at a low temperature range (e.g. 200° C.-300° C., and preferably less than about 290° C., (depending on the catalyst); however, other temperature ranges can be suitable depending on the catalyst and solvent and associated reaction kinetics. The use of SPHDO reaction product as the solvent allows higher temperature reactions without polymerization as does the use of noble metals as a catalyst component. The SPHDO treatment process can result in conversion of products such as methoxyphenols to benzenediols and methane, and then subsequent elimination of one OH group from benzenediols to produce phenols. Further, elimination and/or reduction of acid sites on surfaces of an SPHDO catalyst support can prevent undesirable coke buildup. As illustrated in Equation I, a reaction scheme for partial hydrodeoxygenation/stabilization of guaiacol (2-methoxyphenol) is shown.

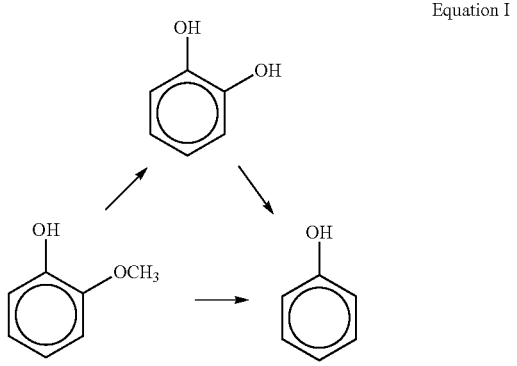

Equation I

The bond dissociation energy of the oxygen atom attached to aromatic carbons in phenols and ethers is about 84 kJ/mol greater than that of an oxygen atom attached to aliphatic carbons. This can at least partially explain why removal of a methyl group from a methoxy group is easier than removal of entire methoxy groups. Production of methane is quite low, with some hydrocarbons. This product can be useful as a fuel source and can be combusted on site as an additional heating source. The partial hydrodeoxygenation/stabilization reactions of the present invention can act to remove polymerizable moieties to reduce or prevent undesirable polycondensation products from forming. Thus, the stabilization/partial hydrodeoxygenation, SPHDO, is particularly helpful in that the product of the SPHDO reaction (largely monooxygenated, monocyclic, bicyclic and small amounts of tricyclic aromatic compounds) undergoes very limited polymerization reactions during the SPHDO step as well as during subsequent hydroprocessing. Thus the catalysts in these steps are not substantially fouled/coked as often occurs in the absence of the SPHDO step. This is in distinction to the step characterized as "exhaustive" deoxygenation in the prior art which results in a different product, mainly monocyclic hydrocarbons, but undesirable polymerization (with consequent coking) occurs.

The resulting SPHDO phenolic products can then be subjected to a variety of refining steps such as hydroprocessing (HPR) without formation of substantial polycondensation products. Thus, the SPHDO step can allow for reduced catalyst coking, reduced reaction temperatures and reduced costs, as well as allow subsequent high-temperature (>300° C.) hydroprocessing (HPR), i.e. substantially complete hydrodeoxygenation (HDO) and mild hydrocracking (HCR) to break interaromatic C—C linkages while preserving valuable bicyclic compounds. HPR is performed under hydrogen pressure and may range, e.g., from about 500 psi to about 2500 psi. although other pressures may be employed as practiced in the art.

HDO and HCR reactions can be carried out either separately or in a single processing step. Careful selection of HDO and HCR catalysts and process conditions is desirable for selective conversion of BCD-SPHDO product to a monomeric, mostly aromatic product, where such a product is desired. Alternatively, the SPHDO product can be exhaustively hydrodeoxygenated and hydrogenated to naphthenic products using appropriate catalysts known in the art.

As a general matter, HDO catalysts in the HPR process can be chosen based on low aromatic ring hydrogenation activity and HCR catalysts based on optimizing acidity and low aromatic ring hydrogenation activity when aromatic fuels, such as gasoline products, are desired. Aromatic ring hydrogenation during these reactions can, if desired, be minimized by careful choice of the catalyst and associated temperatures. A Co—Mo catalyst on $Al_2O_3$ is preferred for this reaction.

In accordance with the present invention, particular attention can be given to preparing effective SPHDO catalysts possessing high activity and resistance to the deactivation effects. In one aspect, a sulfided SPHDO catalyst can be prepared by altering typical HDO catalysts. For example, an acidic alumina support can be replaced with alternative, non-acidic supports such as non-acidic alumina (neutralized with NaOH, KOH, etc.), active carbon, silica, and composites thereof. In general, metals from Group VI or Group VIII of the Periodic Table can be incorporated into the active phase of the catalyst. In yet another alternative, SPHDO catalysts such as supported or unsupported transition metal (in Group VI and VIII and vanadium) nitrides and carbides can be useful. Non-limiting examples of suitable SPHDO nitride and carbide catalysts can include but are not limited to supported or unsupported transition metal nitrides, supported or unsupported transition metal carbides, or combinations thereof. Examples of transition metal nitrides include but are not limited to VN; TiN, and combinations thereof. Examples of transition metal carbides include but are not limited to WC, $Mo_2C$, VC, and combinations thereof. Catalysts composed of Pt, Co and Mo are used in the sulfided form. Noble metal catalysts such as Pt, Pd, Rh, Ru, and/or Cr and combinations thereof may be used. The noble metals are used in combination with other catalyst components such as Mo and Co and are positioned on supports. The transition metal carbides and nitrides may be used in bulk or on supports as disclosed herein. It is understood that combinations of the aforementioned catalysts can be used. As a catalyst for SPHDO step, the acidity can be one important factor in determining effectiveness. In particular, SPHDO catalyst support materials are generally non-acidic such that the reaction kinetics of the catalytic stabilization reactions are controlling over non-catalytic repolymerization and coking reactions. As temperatures increase, the non-catalytic coking reactions tend to become controlling. For example, Co—Mo/$Al_2O_3$SPHDO non-acidic catalysts typically have a maximum operating temperature of about 300° C. before non-catalytic coking reactions become controlling; which leads to poisoning of the catalyst. Thus, lower temperatures, e.g. about 200 up to about 300° C., preferably 280-290° C., are preferentially employed in the SPHDO step. Other SPHDO catalysts and temperature conditions may vary. However, at least some minor repolymerization reactions can be desirable as such species in minor amounts can act as catalytic promoters for the desirable SPHDO oxygen-group elimination reactions. Noble metal-containing catalysts are generally more active and selective for SPHDO than standard HDO catalysts. Another important advantage of noble metal catalysts is their ability to perform selective direct elimination of entire methoxy groups resulting in compounds containing only one atom of oxygen (such as phenols) as a main product. Furthermore, such catalysts can be less active for unwanted reactions, e.g., coking and aromatic ring hydrogenation when aromatic products are desired. More highly active catalysts can perform acceptably well in a lower temperature range where coking reactions proceed more slowly. Also, application of active carbon or $SiO_2$ as an SPHDO catalyst support can provide reduced coking. As a general guideline, the SPHDO catalyst and support material are substantially free of acidic sites sufficient to avoid poisoning by coking at the specified operating temperatures. A particularly suitable catalyst is supported on a "mesoporous" support. The mesoporous support is a purely siliceous material with large uniform pores (about 2-6 nm). A suitable mesoporous support is known in the art as SBA-15.

Several illustration of applications of the present invention are described in detail below with respect to an enhanced catalytic lignin conversion process such as an enhanced lignin-to-gasoline (ELTG) process; an enhanced lignin to napthene kerosene process (ELTK) process, an enhanced lignin-to-aromatic ethers (ELTE) process; and an integrated lignin-to-liquid fuels process (ILTF). Each of these processes includes the same basic lignin conversion stages, e.g., BCD and SPHDO. Specific operating conditions and additional further stages such as refining steps can depend on the desired product.

Enhanced Lignin-to-Gasoline (ELTG) Process

A flow diagram of the enhanced lignin conversion process for production of aromatic gasoline or gasoline additives in a three-stage procedure is illustrated in FIG. 1. In the first stage of the process, a lignin feed is subjected to base-catalyzed depolymerization (BCD) to form a partially depolymerized product. In the second stage, the partially depolymerized BCD product can be subjected to a low temperature stabilization/partial hydrodeoxygenation (SPHDO) process. During the third stage of the process, the SPHDO product can be hydroprocessed to obtain bio-fuel products including aromatic-rich gasoline, usually $C_5$ to $C_{11}$ and a higher molecular weight fraction, typically $C_9$-$C_{15}$, total carbon content. The specific bio-fuel product composition can strongly depend on the HPR processing conditions. The latter fraction can be optionally subjected to exhaustive aromatic ring hydrogenation to obtain valuable naphthenic kerosene (NK). Each of these steps is discussed in more detail below.

In the first stage of the process a lignin material can be dissolved in an aqueous base-catalyst solution. The BCD process proceeds as described above and in the prior art references mentioned above. Although specific process conditions can vary, typical reaction temperatures can range from about 230° C. to below about 350° C. Similarly, autogenic pressure of from about 1000 to about 2300 psig can be useful. The BCD reaction can generally be operated at a lignin material feed rate in liquid hourly space velocity (LHSV) of about 0.5 to about 6.0 hr-1. Alkali and alkaline earth metal hydroxides can be used as base catalysts. Non-limiting examples of suitable base catalysts can include NaOH, KOH neat, $Ca(OH)_2$, $Mg(OH)_2$, and mixtures thereof. In one aspect, the liquid medium is water; however, methanol and/or ethanol can also be used, as well as combinations of water, methanol, and/or ethanol.

Preferably, a continuous stirred-tank reactor (CSTR) can be used in connection with the BCD process. However, any reactor which reduces or eliminates accumulation of precipitates can be used, e.g., any agitated reactor, and the like. Precipitates can appear in connection with reduction in the base catalyst concentration during the BCD process and can also cause reactor plugging.

The primary solid/liquid portion of the BCD reaction product can be precipitated by acidification with $CO_2$ and/or other acidic species such as, but not limited to, hydrochloric acid, sulfuric acid, phosphoric acid, and the like. As an added benefit, washing with phosphoric acid can also result in a fertilizer by-product. The precipitated BCD product can then be washed and dried. The remaining non-precipitated BCD water-soluble product (mostly benzenepolyols such as benzenediol) can be extracted from the water solution with diethyl ether and added to the acid-precipitated water-insoluble primary portion of the product. Alternatively, the extracted water soluble BCD product can be used as a source of valuable bio-chemicals as is. The dry BCD product can be diluted at a temperature range of about 100° C. to about 150° C. with any number of liquid vehicles such as self-produced, selected fractions of SPHDO and/or HPR products. Insoluble high-molecular weight components can be separated by filtration or centrifugation and desalted. These insoluble components can be used as feed in the SPHDO process. A suitable desalting treatment similar to those applied in crude oil treatment can be useful to prevent corrosion and catalyst poisoning effects by sodium and calcium salts occluded in the solid BCD product. In yet another alternative, diluted ether-extracted low-molecular weight fraction of the BCD product can be used as feed in the SPHDO process.

During the initial period of the previous studies of the partial base catalyzed depolymerization (BCD) of lignin the catalyst examined in the process was NaOH (KOH and CsOH were also tested), whereas supercritical methanol or ethanol were used as solvents and reaction media. Batch reactor experiments with alcoholic solvents have shown a high degree of lignin depolymerization (up to 98 wt % of an ether-soluble product). However, during the BCD process, extensive ring methylation (ethylation), and partial conversion of methanol and ethanol to formic and acetic acids, respectively, took place. These reactions resulted in formation of higher molecular weight ($\geq C_9$) phenols. Alcohol solvents can be replaced with the cheaper, non-alkylating solvent, water.

Using a packed flow reactor system, water as a solvent, and NaOH as a catalyst, lignin can be converted up to 60-80 wt % of ether-soluble product at moderate temperature and short reaction times. Experiments using an NaOH—$Ca(OH)_2$ (low NaOH concentration) system in a batch microreactor showed significant resistance to NaOH catalyst neutralization. In addition, $Ca(OH)_2$ contributes mainly in the BCD reaction as $CO_2$ and weak organic acid scavenger.

The hydrolysis of etheric linkages in the lignin structure in the BCD process results in the formation of significant amounts of monomeric phenols and benzenediols and alkoxyphenols which are also valuable chemical co-products.

The partially depolymerized lignin BCD product or its ether extract, after it is diluted with a part of the fraction of the self-produced phenolic and/or high boiling alkylaromatic product, is subjected to a low temperature stabilization/partial hydrodeoxygenation (SPHDO) process. This process can include the conversion of unstable methoxyphenols and benzenediols to a stable phenolic product on catalysts such as those discussed herein such as Co—Mo catalysts supported on alumina and/or active carbon. These catalysts can be used after modification by neutralization of the support surface acidity (alumina) and/or introduction of additional catalyst components such as Pt, Pd, Ru, and Rh which act as promoters.

Currently preferred catalysts of this type are sulfided, noble metal-promoted MMo/C systems, where M=Rh, Ru and Pt. Sulfiding of catalysts can be carried out by treatment with a mixture of hydrogen and hydrogen sulfide. These noble metal-containing catalysts demonstrate high HDO activity and superior selectivity to phenols. An important element of carbon-supported catalyst is the low cost of the carbon support and the ability of recovering the precious metals from spent catalysts by simply burning off the carbon, rather than more expensive refining or recovery processes.

The currently preferred processing conditions for the SPHDO reaction are a temperature from about 200° C. to about 300° C., a residence time of about 15 to about 30 minutes, and $H_2$ pressure from about 500 to about 2000 psig.

Occasionally shorter periods are possible depending on the lignin starting material used. The entire volume of SPHDO organic product is typically subjected to the refining step of hydroprocessing (HPR).

The HPR reaction may be run with the BCD-SPHDO product as feed can be carried out in a single step procedure, or as a sequence of separate HDO and HCR reactions to obtain an aromatic-rich product, consisting mostly of $C_6$-$C_{15}$ aromatics. HDO (CoMo/$Al_2O_3$) and HCR (CoMo/$Al_2O_3$—$SiO_2$ which can be amorphous or crystallized, i.e. zeolite) catalysts are preferred due to their high activity and selectivity in terms of obtaining desirable, mostly monomeric aromatics, free of oxygen, final HPR product where desired. Other useful catalysts can include, but are certainly not limited to, MMo/γ-$Al_2O_3$ (HDO) and MMo/$Al_2O_3$—$SiO_2$ (HCR), where M=Ru, Re, Cr or Fe (and combinations with Co), as well as carbides of W, Mo and V and nitrides of V, Mo and Ti. This process requires a careful selection of optimum reaction conditions and catalysts to minimize aromatic ring hydrogenation reactions in order to maximize monomeric aromatic compounds that are desirable as a final bio-fuels product of the process of the present invention. The degree of undesirable ring hydrogenation of $C_7$-$C_{11}$ alkylbenzenes to corresponding naphthenes, where aromatic fuels are desired, is readily controllable by processing conditions and can be minimized or even substantially eliminated.

Careful selection of HDO and HCR catalysts and process conditions in the hydroprocessing step is desirable for selective conversion of BCD-SPHDO product to a monomeric, mostly aromatic (where desired) product, especially monocyclic liquid aromatic compounds which are useful as high octane gasoline components. Liquid bicyclic aromatic compounds also are formed in such reactions and are useful as gasoline components. Typically, these compounds will be alkylated and the total carbon atoms range from about $C_6$ to $C_{11}$. Higher molecular weight aromatic compounds of this type, generally about $C_9$ to $C_{15}$, may also result from this reaction and are useful as jet fuels. In addition, relatively minor amounts of napthenes, especially about $C_6$ to $C_{10}$ cyclohexanes and about $C_{10}$-$C_{11}$ tetralines (total carbon) may be formed in these reactions and may also be used as gasoline components. As a general matter, when such products are desired, HDO catalysts can be chosen based on low hydrogenation activity and HCR catalysts based on optimizing acidity and low hydrogenation ring activity. Aromatic ring hydrogenation during these reactions may be minimized by careful choice of the catalyst and associated temperatures. Suitable catalysts are CoMo/$Al_2O_3$ and CoMo/$SiO_2$—$AlO_3$. Using Ni in an HDO catalyst is highly active but also tends to result in high yields of cyclohexane and other hydrogenated products as show below. Generally, HDO catalysts in the hydroprocessing step can be neutral, slightly acidic or even slightly basic with substantially neutral being preferred. Specifically, the HDO catalysts can be chosen to allow exhaustive hydrodeoxygenation without poisoning by coking. In contrast, HCR (or MH) catalysts-support materials are generally acidic or strongly acidic sufficient to provide cracking without also causing excessive coking.

Enhanced Lignin to Naphthenic Kerosene (ELTNK) Process

Figure 2:
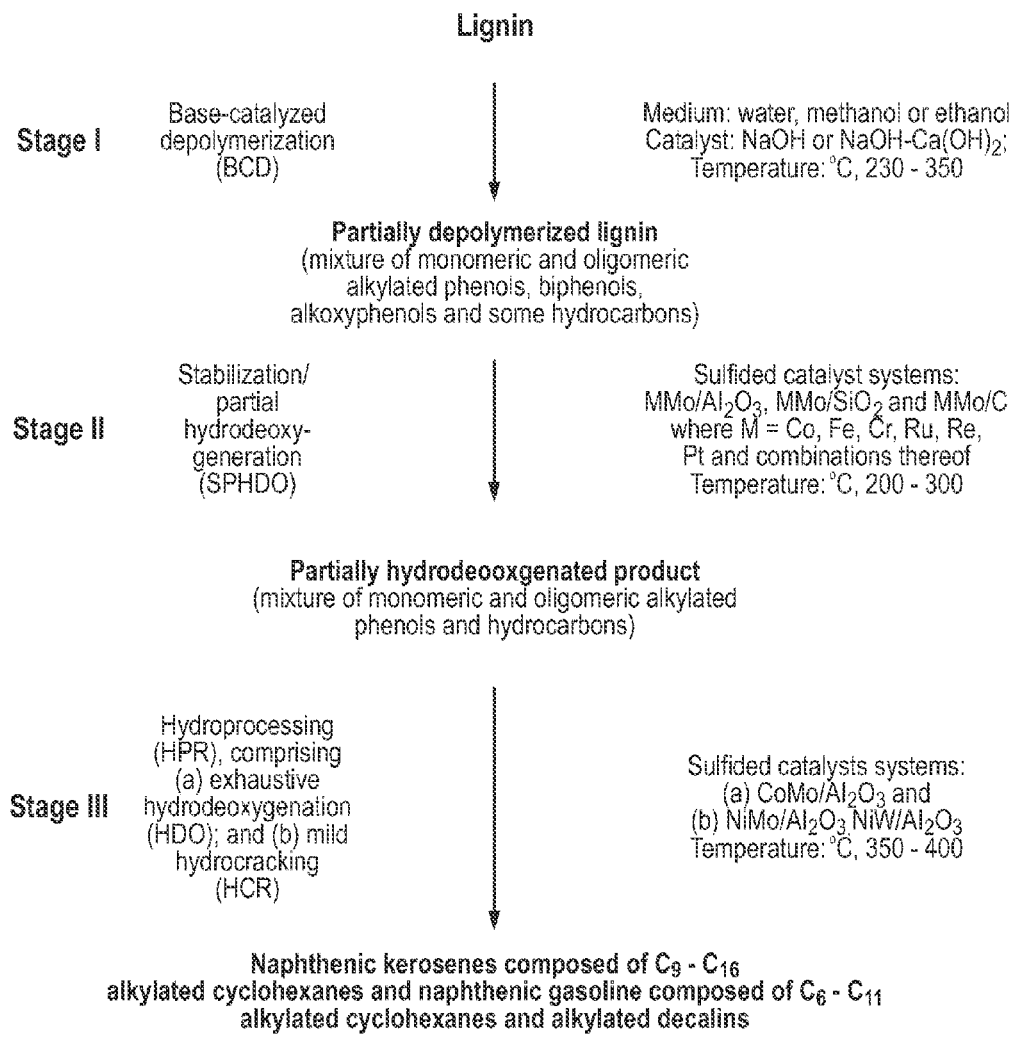
FIG. 2 is a flow diagram of a three stage process for conversion of lignin to liquid monocyclic and bicyclic napthenes especially suitable for jet or rocket fuel.
Figure 8:
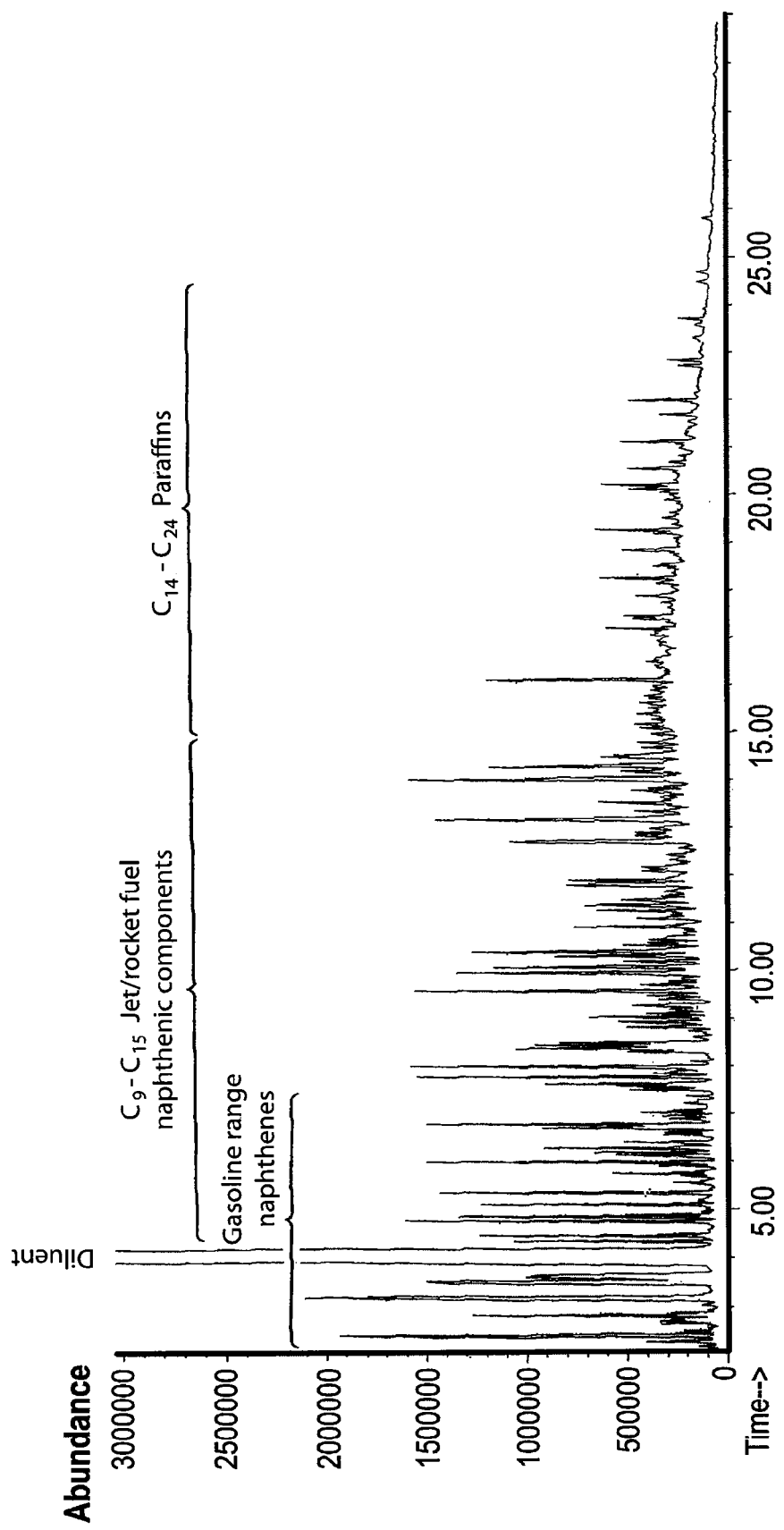
FIG. 8 is a GC/MS profile of BCD-SPHDO-HPR liquid products of Example 1 showing the mainly naphthenic reaction products.

A flow diagram of the enhanced lignin to naphthenic kerosene process is illustrated in FIG. 2. The BCD and SPHDO processes can be carried out as described in the ELTG process. However, in the STAGE III HPR process, a different catalyst is used which tends to fully hydrogenate any aromatic compounds. Suitable catalysts are CoMo/$Al_2O_3$ and NiMo/$Al_2O_3$. The temperature ranges from about 350-450° C. Generally, the products are about 5-60% $C_{10}$-$C_{15}$ alkylated and non-alkylated decalins and about 20-90% $C_5$-$C_{15}$ alkylated and non-alkylated cyclohexanes and cyclopentanes. Small quantities of bicyohexyl compounds are also usually present. These compounds are generally useful as gasoline components and jet/rocket fuel components. Some about $C_6$-$C_{11}$ alkylated cyclohexanes, alkylated cyclopentanes and alkylated $C_{11}$ decalin naphthenic gasoline components can also be present as shown in FIG. 8. Paraffins, usually about $C_{14}$-$C_{24}$ may be present from conversion of by-products in the starting material lignins, such as fats and waxes. C numbers given are total carbon in the molecules.

Enhanced Lignin-to-Aromatic Ethers (ELTE) Process

Figure 3:
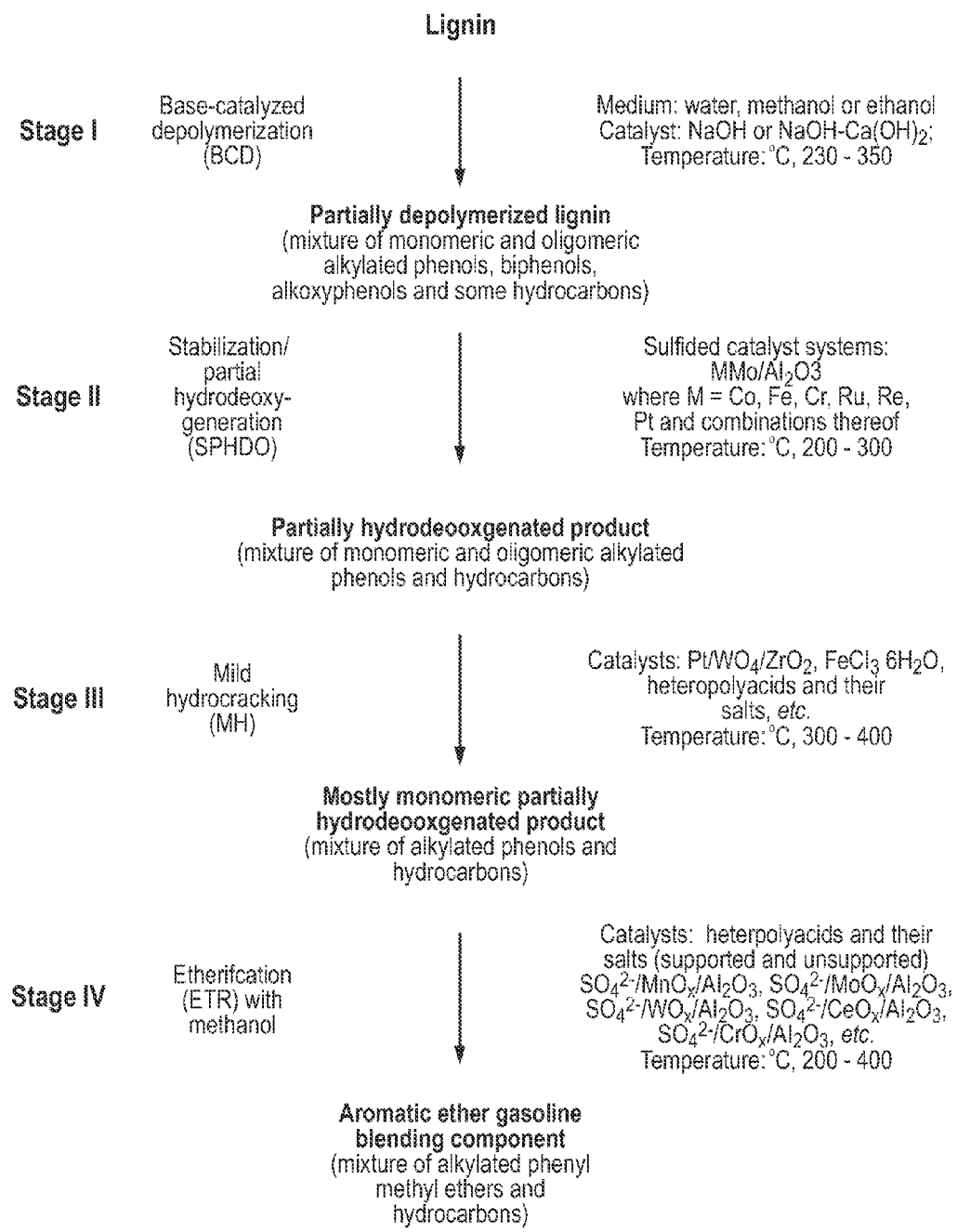
FIG. 3 is a flow diagram of a four stage process for conversion of lignin to aromatic ether gasoline blending components in accordance with an embodiment of the present invention.

Referring now to FIG. 3, the BCD and SPHDO stages of the ELTE process can be nearly the same as presented for the ELTG process of FIG. 1. The BCD-SPHDO product can be subjected to subsequent mild hydro cracking and etherification with methanol.

As previously observed, the BCD-SPHDO of lignin results in a high-yield but incomplete depolymerization of the feed's polymeric structure. For example, in addition to the main product consisting of mono cyclic phenols, there are significant amounts of intermediate phenolic oligomers. To increase the amount of the monomeric product, a mild hydrocracking procedure for the crude BCD product (designated as an MH procedure), in the presence of solid superacid catalysts is shown in FIG. 2 as Stage III. This supplemental MH treatment can effectively depolymerize the lignin by selective C—C cleavage of residual intermediate oligomers to produce the desirable monomeric phenols. Although processing conditions for the MH treatment can vary, the currently preferred processing conditions are a reaction temperature from about 200° C. to about 400° C., a residence time from about 5 to about 30 minutes, and a pressure ($H_2$) from about 1,000 to about 1,800 psig. Non-limiting examples of suitable strongly acidic catalysts for MH treatment step can include Pt/$WO_4^{2-}$/$ZrO_2$, heteropolyacids and their salts (supported and unsupported), $FeCl_3 \cdot 6H_2O$, and the like.

As shown in FIG. 2 at Stage IV, a mixture of light monomeric phenols in the BCD-SPHDO product can be subjected to etherification with methanol. Preferably, the etherification reaction can be performed at a reactor temperature from about 200° C. to about 400° C. and an autogenous pressure from about 100 to about 2000 psig.

Suitable catalysts can include, but are not limited to, supported heteropolyacids or their salts, potassium benzoate, Cs—P/$SiO_2$, $SO_4^{2-}$/$MnO_x$/$Al_2O_3$, $SO_4^{2-}$/$MoO_x$/$Al_2O_3$, $SO_4^{2-}$/$WO_x$/$Al_2O_3$, $SO_4^{2-}$/$CrO_x$/$Al_2O_3$, $SO_4^{2-}$/$CeO_x$/$Al_2O_3$ (where x is variable depending on the method of preparation, as known in the art) and the like. Typically, methanol can be used as the etherification agent. Any flow reactor system which allows for continuous drying of the recycled reaction mixture can be used. The ELTG process of the present invention provides a number of benefits over previously available processes. The majority portion of oxygen present in the BCD-SPHDO product can be preserved which eliminates the need for costly further hydro deoxygenation steps. Additionally, oxygen remains incorporated in a major portion of the final, high-octane alkoxybenzene gasoline components. Therefore, there is substantially no need for outside oxygen-containing additives, as recommended by the Clean Air Act amendment. Also, the final total ELTG product, including hydrocarbons, is expected to have octane numbers of about 130. As a result, these products can be conveniently used as a blending additive (e.g. to petroleum-derived gasolines having lower octane numbers) to generate premium reformulated gasolines possessing greatly improved combustion characteristics Integrated Lignin-to-Liquid Fuels (ILTF) Process In another aspect of the present invention, the ELTG ELNK and ELTE processes can be integrated into a single process. The final products derived from such an integrated process can include the products of each of the ELTG/ELTNK and ELTE processes such as alkylbenzene gasoline, aromatic ether gasoline additives, and naphthenic kerosene.

As discussed above in connection with FIGS. 1 and 2, a base catalyzed depolymerization reaction can be used to produce a partially depolymerized lignin product. The base catalyzed depolymerization reaction can be performed with substantially only water or with ethanol or methanol as the solvent and reaction medium. Following the BCD reaction, a low temperature stabilization/partial hydrodeoxygenation (SPHDO) process and (optional) fractionation of $C_6$-$C_9$ alkylphenols from the SPHDO product can be performed. High temperature hydroprocessing reactions (HPR) of SPHDO product can yield aromatic-rich gasoline as a primary product. Further, exhaustive hydrogenation moncyclic and bicyclic aromatics and of higher molecular weight fraction of the HPR product, containing some alkylated naphthalenes, alkylated tetralines, alkylated indanes, alkylated biphenyls and polyalkylated benzenes, yields high-value naphthenic kerosenes which are especially suitable for rocket/jet fuels. Etherification of $C_6$-$C_9$ alkylphenols from the SPHDO product can be performed to produce aromatic ethers (alkylated alkoxybenzenes). Each of these steps was previously discussed in connection with FIGS. 1 and/or 2.

Figure 4:
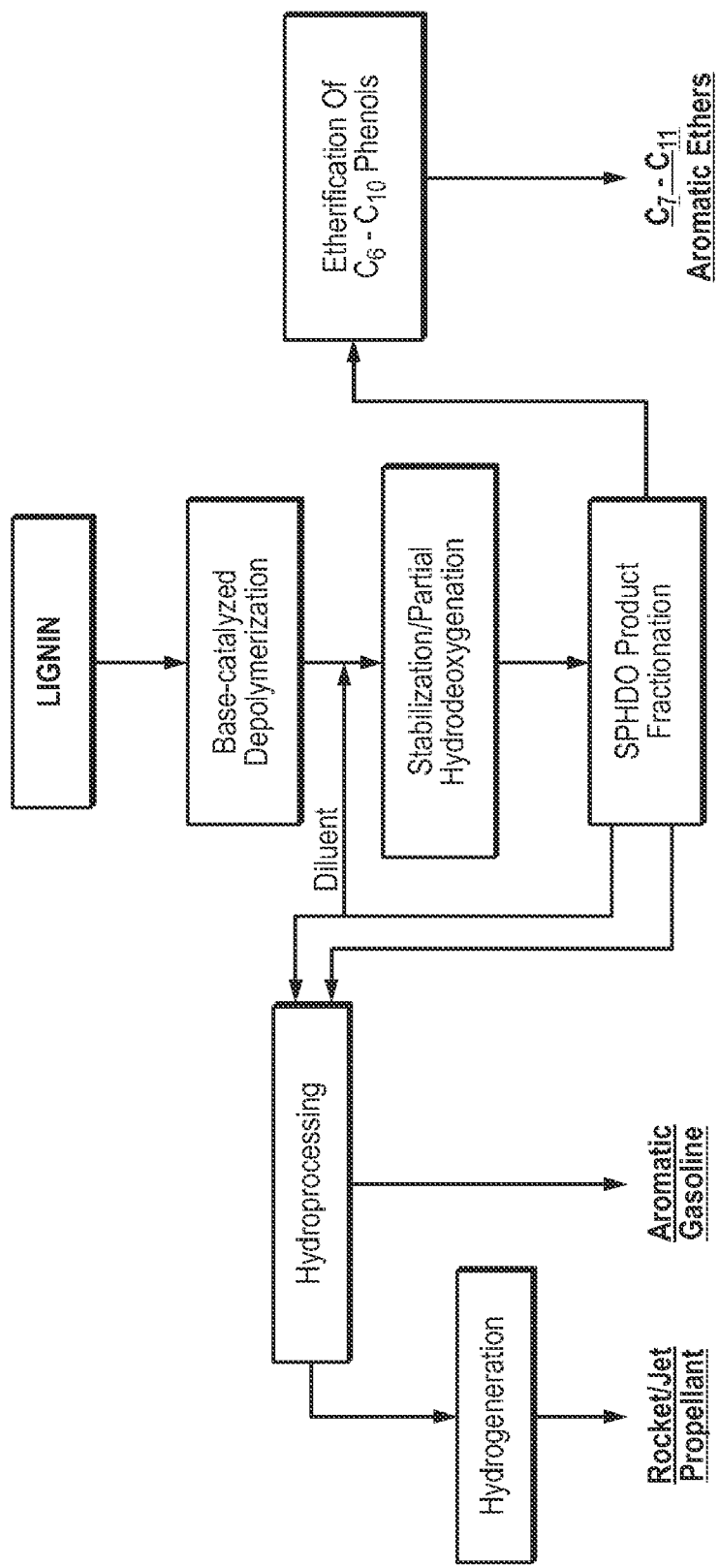
FIG. 4 is a flow diagram of an integrated process for conversion of lignin to a variety of liquid transportation fuels in accordance with another embodiment of the present invention.

A flow diagram of the integrated lignin conversion process (ILTF) for production of aromatic gasoline, rocket/jet propellant and aromatic ethers in a multi-stage procedure is presented in FIG. 4. In the first stage of the process, lignin material can be subjected to base-catalyzed depolymerization (BCD) with water, optionally methanol or ethanol, as solvent and reaction medium. The entire partially depolymerized lignin product or its ether extract, after being diluted with a part of SPHDO product and/or the high-boiling fraction of the alkylaromatic product, can be subjected to a low temperature stabilization/partial hydrodeoxygenation (SPHDO) process. This SPHDO process involves the conversion of unstable methoxyphenols and benzenediols to a more stable phenolic product. During a third stage of the process, the partially hydrodeoxygenated SPHDO product can be subjected to hydroprocessing (HPR) reactions in order to obtain aromatic-rich gasoline. Monocyclic aromatics bicyclic aromatics and higher molecular weight compounds, e.g., alkylated naphthalenes, alkylated tetralines, alkylated indanes, alkylated biphenyls and polyalkylated benzenes are produced as a hydroprocessing product. The yields and types of products can be controlled to some extent by the HPR process.

The hydroprocessing products can then be optionally subjected to exhaustive catalytic hydrogenation. This hydrogenation step can yield naphthenic kerosene containing a mixture of $C_9$-$C_{15}$ decalins, alkylated decalins, bicyclohexyls, alkylated hydrindanes, and mono- and/or polyalkylated cyclohexanes. In an optional separate processing approach, $C_6$-$C_9$ alkylphenols fractionated from the SPHDO product can be used as feed for the etherification process with methanol leading to alkoxyphenols The integrated ILTF process can lead to production of at least three valuable fuel products, provides an opportunity to perform the overall lignin conversion process in a feasible way, and can improve the overall economy of the process as well as overall economy of projected bio-refineries.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

EXAMPLES

The invention is illustrated by non-limiting examples of experimental procedures and related yields and product compositions.

Example 1

Base-catalyzed Depolymerization (BCD).

A 15.0 g of solid Organosolv lignin (Aldrich) sample dissolved in 150 g of 5.0% aqueous solution of NaOH was introduced in a 300 cc autoclave reactor (Autoclave Engineers). The reactor was purged with $N_2$ prior to the start of the heat-up period. After reaching a temperature of 295° C., the reaction was carried out for 30 minutes, and then the reactor was cooled down to room temperature and depressurized. The autoclave reactor is allowed to proceed with a constant stirring rate of 500 rpm (100 rpm during heat-up and cool-down periods). The solid/liquid reaction product was removed from the reactor and acidified with an aqueous 20% $H_2SO_4$ to a pH of 2 to 3, with constant stirring using a magnetic stirrer. After overnight storage, the solid/liquid product was separated from the water solution by filtration, washed with distilled water, dried in a stream of $N_2$, and subjected to Soxhlet extraction with ethyl ether. The extract was dried with anhydrous $MgSO_4$, filtered, and freed from the ether at 40° C. in a rotary evaporator. The water-soluble product in the filtrate was extracted with ethyl ether in a continuous liquid-liquid extractor. The extract was dried with $MgSO_4$, filtered, freed from ether at 40° C. in a rotary evaporator, and added to the main ether-extracted BCD product. The conversion of the lignin feed, determined by the weight of ether-insoluble residue was 68.6 wt %. The following product distribution of the BCD product (based on converted lignin) was obtained: liquid/solid ether extract (low molecular weight product)—85.2 wt %, and gaseous product (mostly $CO_2$)—14.8 wt %.

Figure 5:
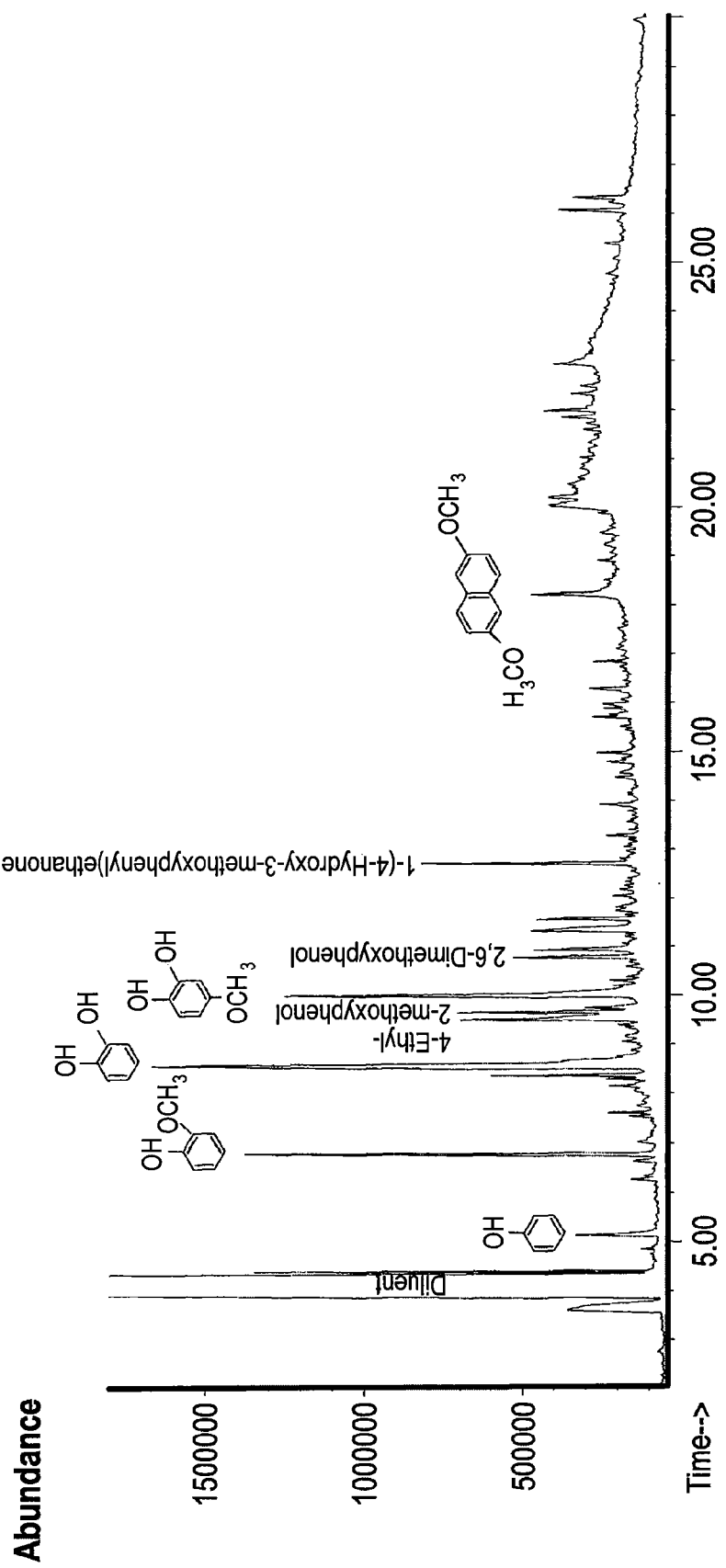
FIG. 5 is a GC/MS profile of liquid/solid BCD products of Example 1.

FIG. 5 shows a GC/MS profile of the BCD liquid/solid product, which is composed of alkylated phenols, alkylated methoxyphenols, benzenediols, and oxygenated bi-, and tri-cyclic aromatics.

Stabilization/Partial Hydrodeoxygenation (SPHDO) of BCD Product.

During this second stage of the procedure (SPHDO), the BCD product is subjected to the conversion of unstable mono-, bi-, and tri-oxygenated bicyclic and tricyclic aromatic compounds to largely mono-oxygenated aromatic product.

7.5 g of BCD product sample, 7.5 g of aromatic hydrocarbon diluent (o-xylene), and 2.0 g of freshly sulfided PtCoMo/C catalyst were introduced into a 25 ml autoclave reactor provided by Parr Instrument Company, Model 4590. The reactor was purged with nitrogen and then with hydrogen and finally was pressurized to 1500 psi with hydrogen. The reaction mixture was heated up to 290° C. in 15 minutes with constant stirring, first at 100 rpm then, after reaching the reaction temperature, at 500 rpm, and the reactor is kept at this temperature for 2 hours. The reactor was then quickly cooled down to room temperature and depressurized and sample of the liquid product was separated from catalyst and water by centrifugation.

Figure 6:
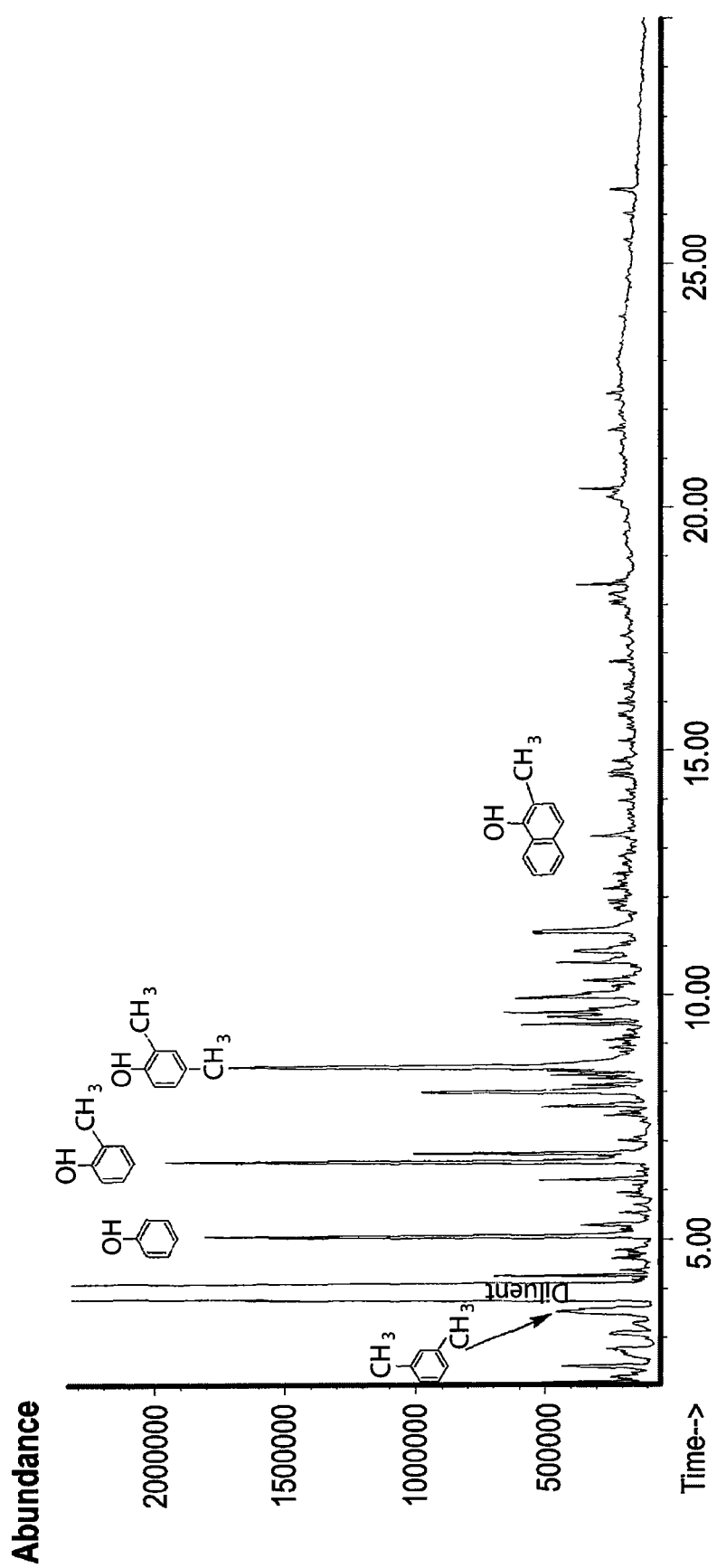
FIG. 6 is a GC/MS profile of BCD-SPHDO liquid products of Example 1.

FIG. 6 shows a GC/MS profile of the BCD-SPHDO liquid product, which is mostly composed of mono-oxygenated alkylated phenols and some mono-oxygenated bi-, and tri-cyclic aromatics.

Hydroprocessing (HPR) of BCD-SPHDO Product for Production of Aromatic Gasoline Product.

The resulting BCD-SPHDO mono-oxygenated aromatic product was subjected to hydroprocessing for exhaustive hydrodeoxygenation and mild hydrocracking.

10.0 ml. of BCD-SPHDO product sample was introduced into a 25 ml micro autoclave reactor provided by Parr Instrument Company, Model 4590, and to this is added 2.0 g of freshly sulfided HPR hybrid catalyst. The catalyst system used in the HPR stage of the process constitutes a suitable mechanical mixture of two (1:1 ratio) commercial (Akzo Nobel) catalytic components: a sulfided $CoMo/Al_2O_3$ hydrodeoxygenation catalyst and a sulfided mild hydrocracking $CoMo/SiO_2$—$Al_2O_3$ catalyst. The reactor was purged with nitrogen and then with hydrogen and finally is pressurized to 1500 psi with hydrogen. The reaction mixture was heated up to 360° C. in 20 minutes with constant stirring, first at 100 rpm then, after reaching the reaction temperature, at 500 rpm, and the reactor was kept at this temperature for 2 hours. The reactor was then quickly cooled down to room temperature and depressurized and sample of the liquid product was separated from catalyst and water by centrifugation.

Figure 7:
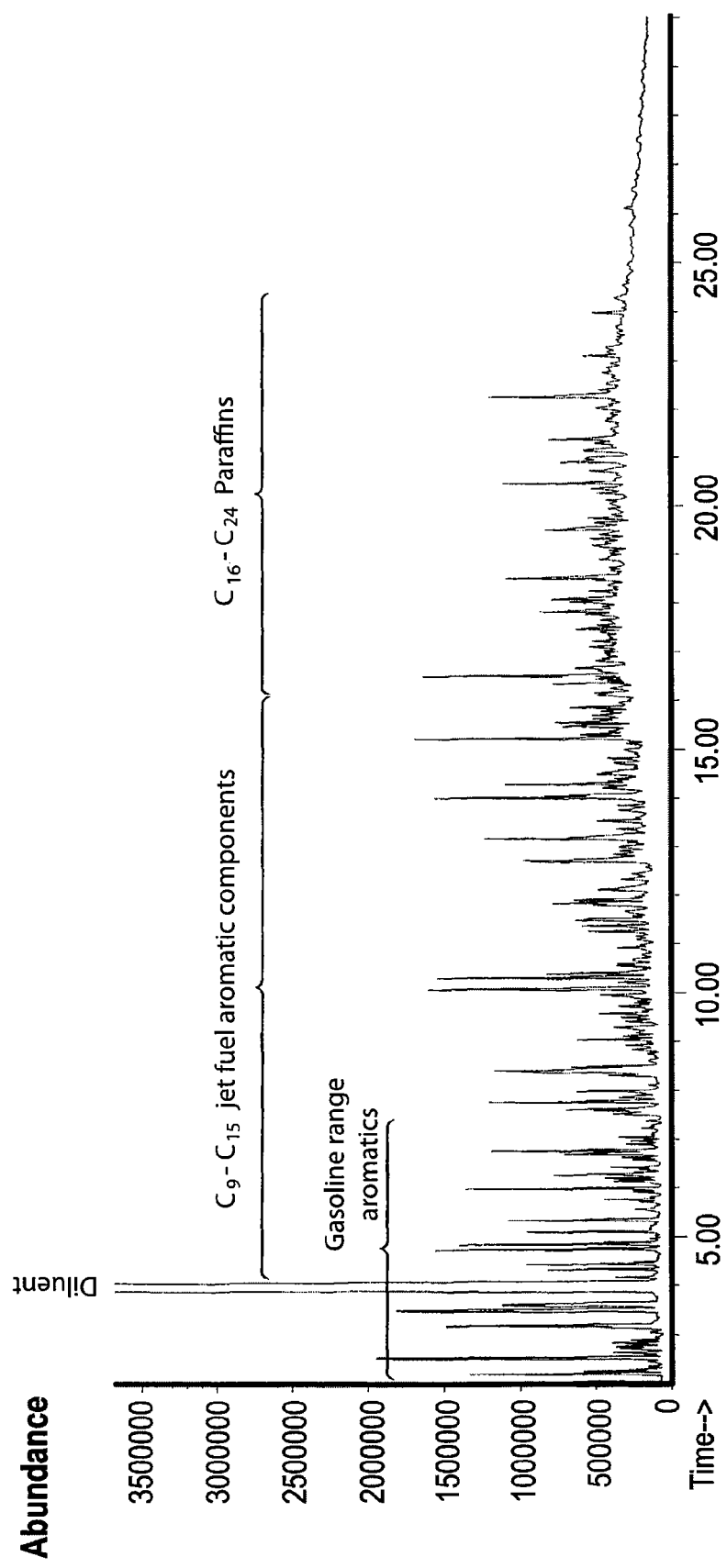
FIG. 7 is a GC/MS profile of BCD-SPHDO-HPR liquid products of Example 1 showing gasoline range and jet fuel aromatic components.

FIG. 7 shows a GC/MS profile of the BCD-SPHDO-HPR liquid aromatic product, which is mostly composed of alkylated benzenes and alkylated bi- and tri-cyclic aromatic compounds.

Hydroprocessing (HPR) of BCD-SPHDO Product for Production of Naphthenic Kerosene and Naphthenic Gasoline.

The resulting BCD-SPHDO mono-oxygenated aromatic product was subjected to hydroprocessing for exhaustive hydrodeoxygenation and exhaustive aromatic ring hydrogenation.

10.0 ml. of BCD-SPHDO product sample was introduced into a 25 ml micro autoclave reactor provided by Parr Instrument Company, Model 4590, and to this is added 2.0 g of freshly sulfided HPR hybrid catalyst. The catalyst system used in the HPR stage of the process constitutes a suitable mechanical mixture of two (1:1 ratio) commercial (Akzo Nobel) catalytic components: a sulfided $CoMo/Al_2O_3$ hydrodeoxygenation catalyst and a sulfided $NiW/Al_2O_3$ catalyst. The reactor was purged with nitrogen and then with hydrogen and finally is pressurized to 1500 psi with hydrogen. The reaction mixture was heated up to 375° C. in 20 minutes with constant stirring, first at 100 rpm then, after reaching the reaction temperature, at 500 rpm, and the reactor was kept at this temperature for 2 hours. The reactor was then quickly cooled down to room temperature and depressurized and sample of the liquid product was separated from catalyst and water by centrifugation.

FIG. 8 shows a GC/MS profile of the BCD-SPHDO-HPR liquid fully hydrogenated product, which is mostly composed of alkylated cyclohexanes and alkylated bi- and tri-cyclic naphthenic compounds.

Example 2

Base-catalyzed Depolymerization (BCD).

A 15.0 g of solid Organosolv lignin (Aldrich) sample was introduced in a 300 cc autoclave reactor (Autoclave Engineers) then 150 g of 5.0% methanolic solution of NaOH. The reactor was purged with $N_2$ prior to the start of the heat-up period. After reaching a temperature of 295° C., the reaction was carried out for 30 minutes, and then the reactor was cooled down to room temperature and depressurized. The autoclave reactor was allowed to proceed with a constant stirring rate of 500 rpm (100 rpm during heat-up and cool-down periods). The solid/liquid reaction product was removed from the reactor and after adding 200 g of water was acidified with an aqueous 20% $H_2SO_4$ to a pH of 2 to 3, with constant stirring using a magnetic stirrer. After 16 hour of storage, the solid/liquid product is separated from the water solution by filtration, washed with distilled water, dried in the stream of $N_2$, and subjected to Soxhlet extraction with ethyl ether. The extract was dried with anhydrous $MgSO_4$, filtered, and freed from the ether at 40° C. in a rotary evaporator. The water-soluble product in the filtrate is extracted with ether in a continuous liquid-liquid extractor. The extract is dried with $MgSO_4$, filtered, freed from ether at 40° C. in a rotary evaporator.

The conversion of the lignin feed, determined by the weight of ether-insoluble residue was 97.8 wt %. Due to substantial alkylation (methylation) of BCD product, the total weight of obtained solid/liquid product was 17.1 g. The following product distribution of the BCD product (based on converted lignin): liquid/solid ether extract (low molecular weight product)—88.7 wt %, and gaseous product (mostly $CO_2$)—11.3 wt % was obtained.

FIG. 5 shows a GC/MS profile of the BCD liquid/solid product, which is composed of alkylated phenols, alkylated methoxyphenols, benzenediols, and oxygenated bi-, and tri-cyclic aromatics.

Stabilization/Partial Hydrodeoxygenation (SPHDO) of BCD Product and Subsequent Hydroprocessing (HPR) of BCD-SPHDO Product for Production of Aromatic Gasoline Product Procedures were the Same as in Example 1.

Figure 9:
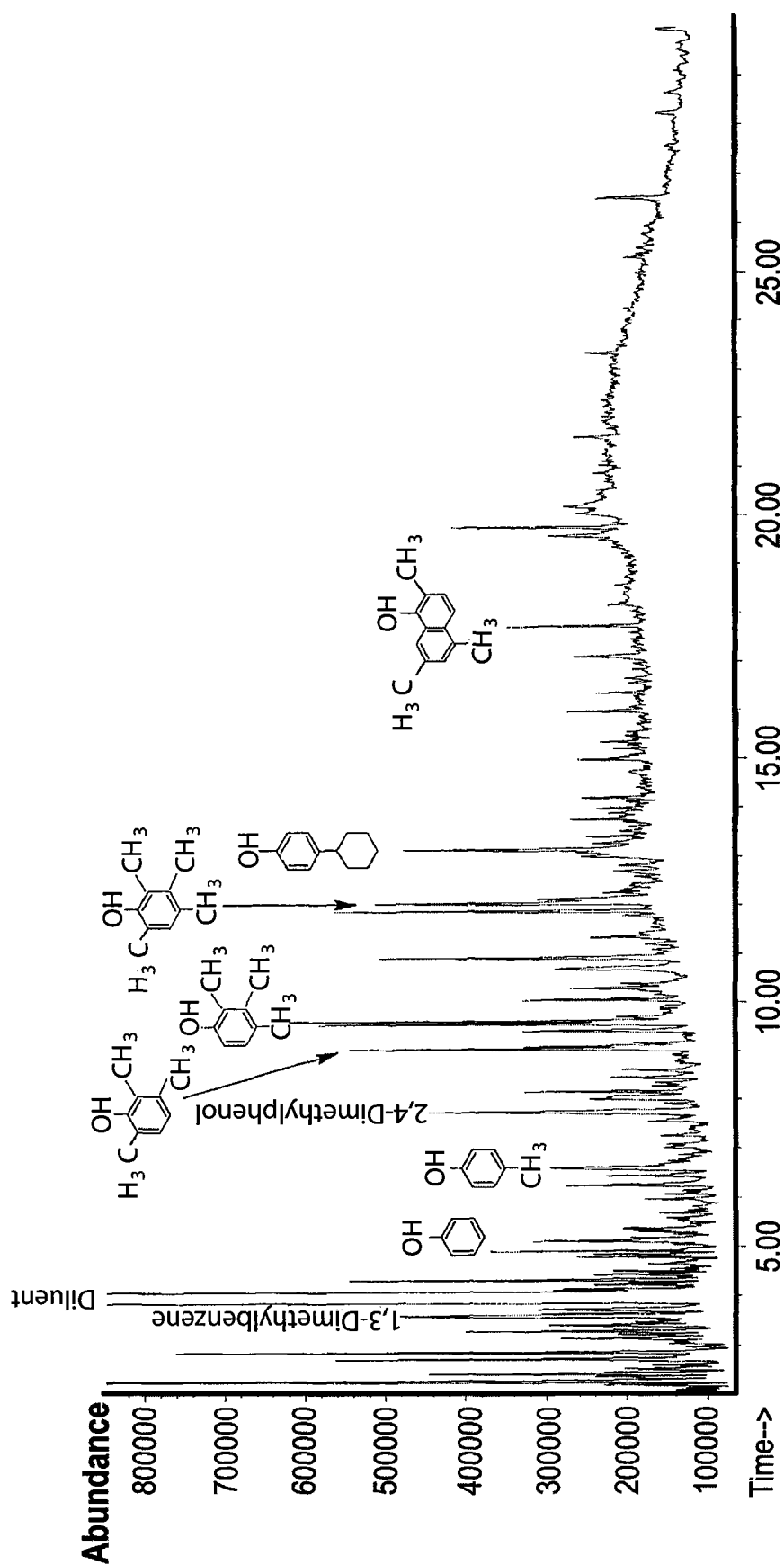
FIG. 9 is a GC/MS profile of the BCD-SPHDO liquid product of Example 2.

FIG. 9 shows a GC/MS profile of the BCD-SPHDO liquid product, which is mostly composed of mono-oxygenated alkylated phenols and some mono-oxygenated bi-, and tri-cyclic aromatics.

Figure 10:
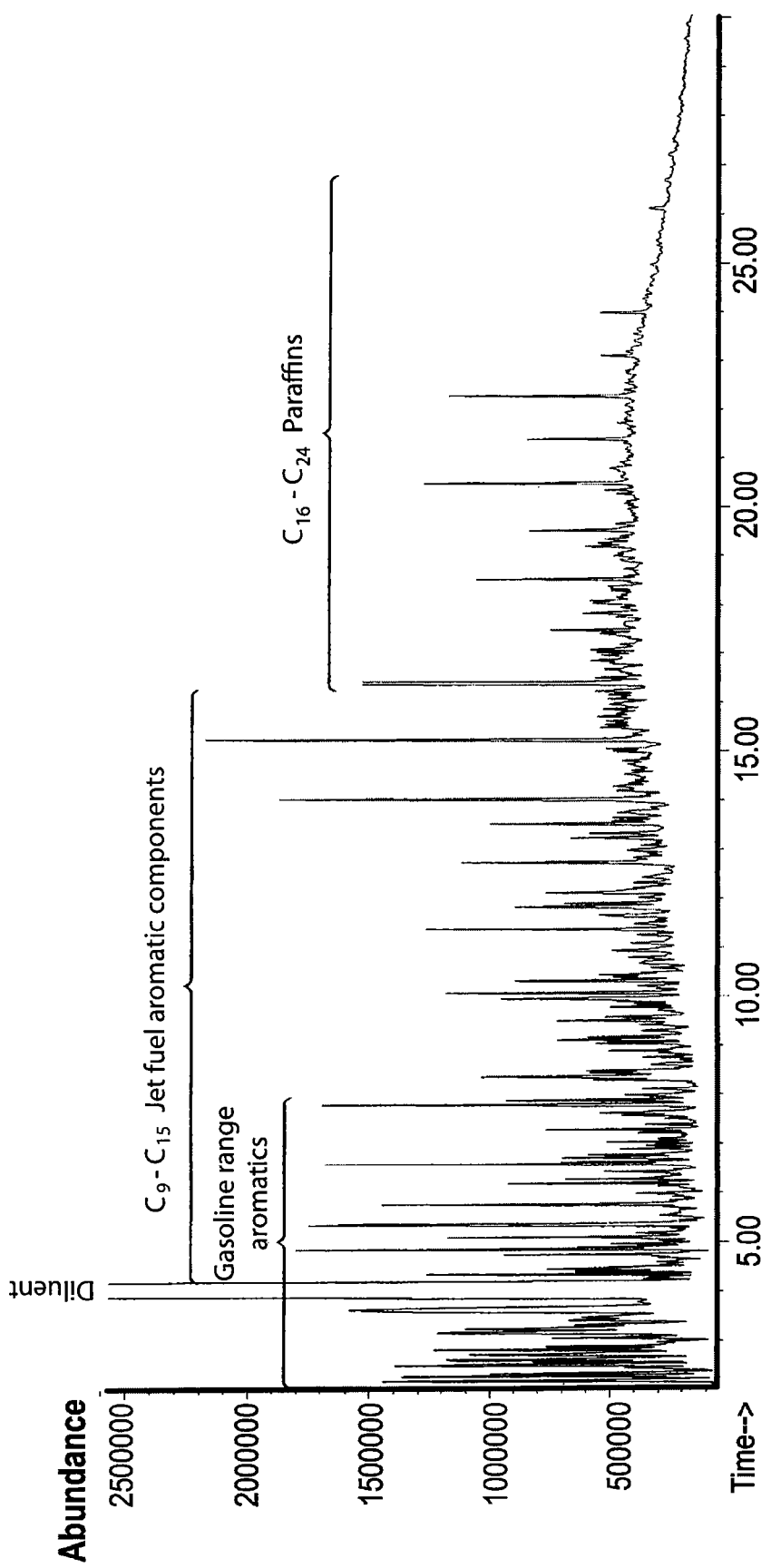
FIG. 10 is a GC/MS profile of BCD-SPHDO-HPR liquid aromatic product of Example 2.

FIG. 10 shows a GC/MS profile of the BCD-SPHDO-HPR liquid aromatic product, which is mostly composed of alkylated benzenes and alkylated bi- and tri-cyclic aromatic compounds.

What is claimed is:

1. A process for conversion of a lignin material to substantially phenolic compounds comprising:
   a) Subjecting the lignin material to a base catalyzed depolymerization reaction to produce a partially depolymerized lignin;
   b) Subjecting the partially depolymerized lignin to a stabilization/partial hydrodeoxygenation reaction to form a partially hydrodeoxygenated product, said process being carried out in the presence of a catalyst containing one or more metals selected from the group consisting of Group VI metals of the Periodic Table, Group VIII metals of the Periodic Table, vanadium and mixtures thereof; wherein said partially hydrodeoxygenated product is substantially comprised of aromatic compounds having a single oxygen moiety substituent, and
   c) Treating the product of step b) in a mild hydrocracking process to produce substantially monomeric phenols.

2. The process of claim 1 wherein the step b) is carried out at a temperature of about 200 to about 300° C.

3. The process of claim 1 wherein the catalyst is selected from the group consisting of sulfided Mo, Co, Pt, and of VN, $Mo_2N$, TiN, WC, $Mo_2C$, VC, and mixtures thereof.

4. The process of claim 3 wherein the catalyst is positioned on a support selected from the group consisting of carbon and silicon dioxide.

5. The process of claim 1 wherein the catalyst is selected from the group consisting of sulfided Pt, Co, Mo and mixtures thereof.

6. The process of claim 1 wherein the catalyst is positioned on a support selected from the group consisting of carbon and silicon dioxide.

7. The process of claim 1, wherein the stabilization/partial hydrodeoxygenation step is carried out at a temperature of about 200 to about 300° C. in the presence of a catalyst that is selected from the group consisting of sulfided Pt, Co, Mo and mixtures thereof, said catalyst being positioned on a non-acidic activated carbon support.

8. The process of claim 1 wherein the mild hydrocracking process is carried out at a reaction temperature from about 200° C. to about 400° C. and a hydrogen pressure from about 1000 to about 1800 psig.

9. The process of claim 8 wherein the process is carried out in the presence of an acidic catalyst.

10. The process of claim 9 wherein the catalyst is selected from the group consisting of $Pt/WO_4^{2-}/ZrO_2$, heteropolyacids, salts of heteropolyacids, and $FeCl_3.H_2O$.

11. A process for producing aromatic etherified products comprising etherifying the substantially monomeric phenol compounds prepared by the process of claim 1.

12. The process of claim 11 wherein the aromatic etherified product is the substantially monomeric phenol compounds prepared by the process of claim 8.

13. The process of claim 11 wherein the aromatic etherified product is the substantially monomeric phenol compounds prepared by the process of claim 10.

14. The process of claim 11 wherein the etherified product is prepared by reacting the product of claim 1 with an alcohol selected from the group consisting of methanol and ethanol.

15. The process of claim 14 wherein the etherification is carried out at a temperature from about 200° C. to about 400° C.

16. The process of claim 14 wherein the etherification is carried out in the presence of a catalyst selected from the group consisting of heteropolyacids, salts of heteropolyacids, potassium benzoate, Cs—$P/SiO_2$, sulfated manganese oxide/aluminum oxide, sulfated molybdenum oxide/aluminum oxide, sulfated tungsten oxide/aluminum oxide, sulfated chromium oxide/aluminum oxide, and sulfated cerium oxide/aluminum oxide.

* * * * *